United States Patent [19]

Hara et al.

[11] 4,394,542
[45] Jul. 19, 1983

[54] TELEPHONE TRANSMISSION CIRCUIT

[75] Inventors: Michio Hara; Akinobu Tomimori; Hiroshi Hara, all of Tokyo, Japan

[73] Assignee: Nippon Electric Co., Ltd., Tokyo, Japan

[21] Appl. No.: 243,111

[22] Filed: Mar. 12, 1981

[30] Foreign Application Priority Data

Mar. 26, 1980 [JP] Japan .................................. 55-38423

[51] Int. Cl.$^3$ .............................................. H04M 1/60
[52] U.S. Cl. .................................................. 179/81 B
[58] Field of Search ................... 179/1 A, 1 HF, 16 F, 179/81 A, 81 B, 99 A, 100 L, 170 D

[56] References Cited

U.S. PATENT DOCUMENTS

| | | | |
|---|---|---|---|
| 3,748,400 | 7/1973 | Ritz et al. | 179/16 F X |
| 3,825,848 | 7/1974 | Sternbeck | 179/1 A |
| 4,233,474 | 11/1980 | Hishinuma et al. | 179/81 B |
| 4,304,969 | 12/1981 | Walla | 179/81 B |

FOREIGN PATENT DOCUMENTS

| | | | |
|---|---|---|---|
| 2753130 | 6/1978 | Fed. Rep. of Germany | 179/81 B |
| 961755 | 6/1964 | United Kingdom | 179/81 B |
| 1350205 | 4/1974 | United Kingdom | 179/81 B |

OTHER PUBLICATIONS

*Ericsson Review*, No. 3, 1976, pp. 118-132, "Electronic Push-Button Telephone Set-Ericofon 700" by Boeryd et al.

Primary Examiner—C. D. Miller
Assistant Examiner—Keith E. George
Attorney, Agent, or Firm—Sughrue, Mion, Zinn, Macpeak, and Seas

[57] ABSTRACT

A telephone transmission circuit for connection to telephone line terminals includes a transmitter amplifier, a receiver amplifier and a balancing circuit for suppressing the leakage of the output of the transmitter amplifier to the receiver amplifier, the transmitter amplifier being connected to the line terminals so that a power supplied from the line is effectively used. Good impedance matching between the line and the telephone transmission circuit is achieved by the automatic adjustment of the balancing circuit responsive to the line length between the telephone transmission circuit and an exchange.

3 Claims, 7 Drawing Figures

FIG. 1
(PRIOR ART)
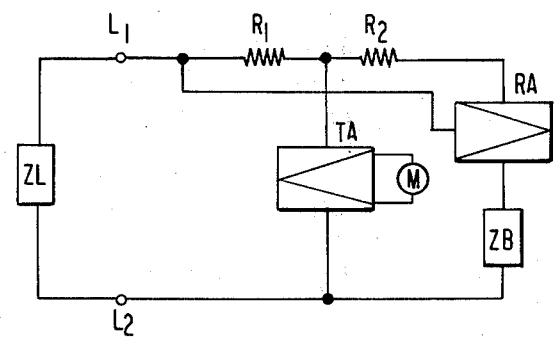
FIG. 2a
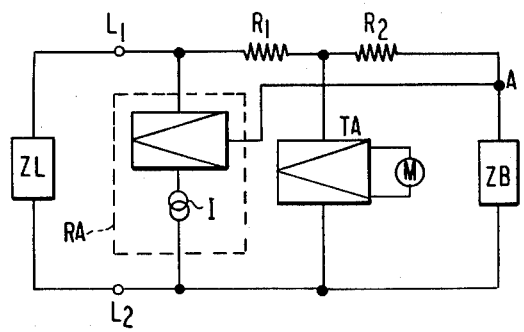
FIG. 2b
FIG. 3
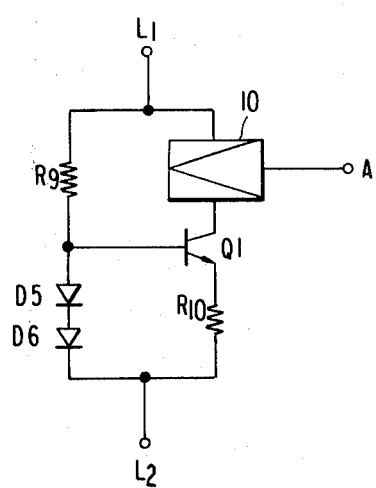

TELEPHONE TRANSMISSION CIRCUIT

BACKGROUND OF THE INVENTION

1. Field of the Invention

The present invention concerns a telephone transmission circuit, and more particularly an improvement in a telephone transmission circuit of the type which incorporates an amplifier.

2. Description of the Prior Art

The use of amplifiers in telephone sets has recently received the attention of industry because of improved performance and reduced prices of such sets resulting from integrated circuit development.

This type of transmission circuit proposed heretofore in the art comprises at its two line terminals, a series circuit including two resistors, a power circuit for a receiver amplifier and a balancing network (See "Electronic Push-button Telephone Set - ERICOFON 700" by Arne Boeryd et al, ERICSSON REVIEW, No. 3, 1976, pp. 118–132). Between the connecting point of two resistances and one of the line terminals are connected a power circuit for the transmitter amplifier and its output circuit. The input for the receiver amplifier is directly connected to the other of the line terminals, while a power circuit for the receiver amplifier is connected between the one line terminal via the balancing network and the end of a series connection of the two resistances opposite to the other line terminal. Thus, the power circuit for the receiver amplifier is supplied electric current from the line terminal via the two resistances resulting in power loss. As for the transmitter amplifier, a power source current and an output signal current are supplied via one resistance, thereby unavoidably lowering the maximum distortionless output. With the conventional type transmission circuit, the impedance of the balancing network must be small, resulting in an increase of the size of the capacitor used. As the impedance of the transmission circuit depends on the impedance of the balancing network, a change of the impedance of the balancing network adversely affects the desired matching of the line impedance and the transmission circuit impedance.

SUMMARY OF THE INVENTION

Accordingly, a primary object of the present invention is to provide a telephone transmission circuit with less power loss and a larger maximum distortionless output.

A second object of the present invention is to provide a telephone transmission circuit with a compact balancing network.

A third object of the present invention is to provide a telephone transmission circuit which provides a better matching with the lines even when the balancing network conditions vary.

The telephone transmission circuit according to the present invention includes a transmitter amplifier which amplifies voice frequency signals from a microphone, a receiver amplifier which amplifies voice frequency signals transmitted from the line, a serially connected circuit of a first resistance, a second resistance and a balancing circuit to be connected between the first and second line terminals. A power circuit and an output circuit for the transmitter amplifier are connected between a connecting point of the first resistance and the second resistance and the second line terminal. In parallel to the serially connected circuit, the receiver amplifier is connected via a constant current circuit. The input signals for the receiver amplifier are supplied via the connecting point of the second resistance and the balancing circuit. Here the first and the second line terminals are connected to the line via a circuit which would at least maintain the polarity of the DC current constant. The phrase of "via the constant current circuit" includes the composition where the power circuit of the receiver amplifier becomes substantially the constant current circuit.

According to the specific feature of the present invention, there is further included means to automatically adjust the conditions for balancing and the conditions for line equalization depending on whether the lines to be connected are far or near from the exchange.

BRIEF DESCRIPTION OF THE DRAWINGS

The invention is further explained by reference to the accompanying drawings wherein:

FIG. 1 is a diagram showing the conventional type telephone transmission circuit;

FIG. 2a is a diagram showing a first embodiment of the present invention;

FIG. 2b is a circuit diagram for a receiver amplifier which includes a constant current circuit used in the first embodiment of the present invention;

FIG. 3 shows a balancing network circuit used in the embodiment of the present invention;

DESCRIPTION OF THE PREFERRED EMBODIMENT

Figure 4:
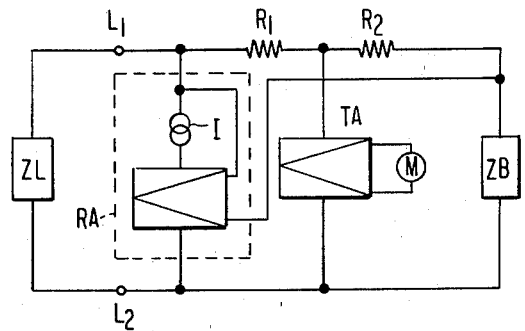
FIG. 4 is a diagram showing a second embodiment of the present invention.

FIG. 1 shows a conventional type transmission circuit wherein a power terminal for a receiver amplifier RA is connected to a line terminal $L_1$ via a series circuit of two resistances $R_1$ and $R_2$, and a power source and an output terminal for a transmitter amplifier TA are connected to the connection point of resistances $R_1$ and $R_2$. The input to the receiver amplifier is supplied directly from the line terminal $L_1$, while the other end of the output from the receiver amplifier RA is connected to another line terminal $L_2$ via a balancing network $Z_B$.

This type of conventional transmission circuit suppresses sidetones by using the balancing network. The power circuit for the transmission amplifier TA and the receiver amplifier RA are supplied direct current from the line terminals $L_1$ and $L_2$. As is clear from FIG. 1, however, the power source current for the receiver amplifier RA passes the resistance $R_1$ and $R_2$, thereby causing losses in power. As for the transmission amplifier TA, the power source current and the output signals pass the resistance $R_1$, thereby decreasing the distortionless output.

In further describing the problems encountered by the conventional type circuit, the transmitting attenuation $b_T$ in the conventional type circuit shown in FIG. 1 is expressed by the following formula:

$$b_T = 20 \log \left( Z_L + R_1 + \frac{1+n}{n} \cdot Z_T \right) \quad (1)$$

-continued
$$-10 \log Z_T \cdot Z_L - 6 \, (dB)$$

wherein
$Z_L$ is the characteristic impedance for the line,
$Z_T$ is the output impedance of the transmission amplifier TA,
n is expressed by the formula:

$$n = \frac{R_2}{R_1} = \frac{Z_B}{Z_L} \quad (2)$$

and is the balancing parameter showing the ratio of the balancing network impedance to the line impedance when the side tone balancing conditions hold.

In the above formula (1), since the characteristic impedance of the line $Z_L$ is constant, and the output impedance $Z_T$ of the transmitter amplifier TA is subjected to restrictions by the characteristic impedance of the circuit, it is necessary to reduce the resistance $R_1$ in order to decrease the attenuation $b_T$. As mentioned above, the power source current passes the resistance $R_1$, it is all the more desirable that the value of $R_1$ be smaller.

On the other hand, the receiving attenuation $b_R$ is expressed by the following formula:

$$b_R = 20 \log [Z_L \left(1 + n + \frac{Z_R}{R_1}\right) + R_1] \quad (3)$$

$$-10 \log Z_R \cdot Z_L - 6 \, (dB)$$

wherein $Z_R$ is the impedance for the receiver amplifier.

From the formula (2), it is understood that the receiving attenuation $b_R$ increases if the value of the resistance $R_1$ is radically decreased as compared to the impedance $Z_R$ of the receiver amplifier. Since the power source current for the receiver amplifier RA passes through the resistances $R_1$ and $R_2$ and the balancing network $Z_B$, these values are also preferred to be smaller.

Considering these conditions, the values of the resistances $R_1$ and $R_2$ and the impedance of the balancing network $Z_B$ must be selected to be small, and yet the value of $R_1$ can not be made too small. Accordingly, the value n of the balancing parameters necessarily becomes small. Thus, the defects of the circuit shown in FIG. 1 are enumerated in the following way.

(1) The impedance of the balancing network, $$Z_B = nZ_L$$

becomes approximately equal or more than $Z_L$, thereby increasing the size of the capacitor in the balancing network. This is a disadvantage with respect to the packaging.

(2) The impedance $Z_O$ of the transmission circuit viewed from the line side is related to $Z_B$, and therefore if $Z_B$ is varied for balancing the sidetones, then $Z_O$ is also varied, thereby causing mismatching with the line.

(3) As the transmission attenuation $b_T$ is large, the gain for the transmitter amplifier TA becomes larger if the desired output is to be achieved, which in turn decreases the distortionless maximum output.

FIG. 2 shows a circuit diagram of one embodiment of the present invention. To the line terminals $L_1$ and $L_2$ are connected a first resistance $R_1$, a second resistance $R_2$ and a balancing network $Z_B$ in series. A transmission amplifier TA and its power source circuit is connected between the connecting point of resistances $R_1$ and $R_2$ and the line terminal $L_2$. Further between the line terminal $L_1$ and the line terminal $L_2$ is connected a power source circuit for a receiver amplifier RA. The input of the receiver amplifier RA is connected to the connecting point of the resistance $R_2$ and the balancing network $Z_B$. The resistance $R_1$ and $R_2$, the balancing network $Z_B$ and the line impedance $Z_L$ form four branches of a conventional impedance bridge circuit with junction points $L_1$, $L_2$, A and junction of the resistances $R_1$ and $R_2$. When the circuit is viewed in its entirety as an alternating current circuit, the transmitter amplifier $T_a$ lies on the bridge diagonal defined by the point $L_2$ and the connection point of the two resistances $R_1$ and $R_2$, while the receiver amplifier $R_A$ lies on the bridge diagonal defined by the points A and $L_1$. Balancing of the bridge circuit is achieved in order to suppress side tones. Accordingly, the input signal to the receiver amplifier $R_A$ is applied from the points A and $L_1$ which are diametrically opposite points on the bridge, and the signal output from the transmitter amplifier $T_A$ is connected between the point $L_2$ and the junction point of the resistances $R_1$ and $R_2$, these two points also being diametrically opposite in the bridge circuit. The signal output from the receiver amplifier is connected to a conventional telephone receiver.

In the circuit having a composition such as the above, as the power source current for the amplifier does not flow through the resistance $R_2$ and the network $Z_B$, there is less of the power loss. Since it is possible to select larger values for the resistance $R_2$ and the network impedance $Z_B$, the balancing parameter n shown in Equation (2) may be increased. Accordingly the impedance $Z_B$ can be made larger than the characteristic impedance $Z_L$ of the line, decreasing the size of the capacitor which constitutes the network $Z_B$. In this embodiment, the value of n may be selected to be 10.

In this embodiment, there is further included a constant current circuit in the power source circuit for the receiver amplifier RA. Specifically, as shown in FIG. 2b, the receiver amplifier circuit includes an operational amplifier 10 and a constant current circuit. The constant current circuit includes a resistance R9, a series circuit of diodes D5 and D6, a transistor Q1, and a resistance R10 connected to the emitter of the transistor. The base of the transistor Q1 is connected to the connecting point of the anode for the diode D5 and the resistance R9, and the emitter is connected to the line terminal $L_2$ via the resistance R10. By connecting the operational amplifier 10 between the line terminal $L_1$ and the collector of the transistor Q1, it is possible to supply the collector current of the transistor Q1. When the operational amplifier is connected to the lines $L_1$ and $L_2$ via such a constant current circuit, the impedance $Z_O$ seen from the line side of this circuit is not effected. Moreover, as n is large, the relationship of $$R_2 + Z_B >> Z_T$$

holds compared to the output impedance $Z_T$ of the transmitter amplifier TA. The impedance $Z_O$ may be deemed to have the relationship of $$Z_O \approx R_1 + Z_T$$

Accordingly, variation of the balancing network $Z_B$ for the purpose of balancing the side tones hardly influences $Z_O$ and does not impair matching with the line.

In this circuit the value of the resistance $R_1$ becomes smaller, the output of the transmission amplifier TA is effectively transmitted to the line with small loss. It is also possible to feed sufficient power source current to the transmitter amplifier TA. Thus, it is also possible to increase the distortionless maximum output of the transmission amplifier TA.

FIG. 3 is a circuit diagram of a preferred balancing network $Z_B$ for use in the present invention. A resistance R3 is connected in parallel to a circuit connecting a resistance R4 and a capacitor $C_1$ in series. The series circuit of Zener diode $ZD_1$ and resistance $R_5$ is connected in parallel to the capacitor $C_1$.

The balancing network $Z_B$ is so constructed that when the line is long, the terminal voltage is low, and the Zener diode $ZD_1$ is in the off condition. When the line length is short, the power arriving at the telephone circuit will be sufficiently large to turn on the Zener diode $ZD_1$, thereby placing resistance R5 in parallel with capacitor $C_1$. The impedance suppresses the sidetone at a short distance. In short, sidetone balancing is achieved with little loss in each of the two applicable regions depending on the line lengths. Even when the impedance of the balancing network $Z_B$ is thus varied, the impedance $Z_O$ is of the tranmsmission circuit hardly varies, as discussed earlier. In one specific example, the above mentioned resistances and the capacitor may be selected to have the following values:

$R_3$ is 8.2 K$\Omega$, $R_4$ is 3.6 K$\Omega$, $R_5$ is 12 K$\Omega$ and $C_1$ is 0.01 $\mu F$, and the Zener diode $ZD_1$ may be selected to have a breakdown voltage of 7 V. FIG. 4 is a circuit diagram of a second embodiment of the present invention. This embodiment is characterized in that the receiver amplifier RA has differential input terminals, and one of the inputs is connected to the line terminal $L_1$. Other components of the embodiment are the same as that shown in FIG. 2. Accordingly, the description of the detailed operation and the operational effect is omitted.

Figure 5:
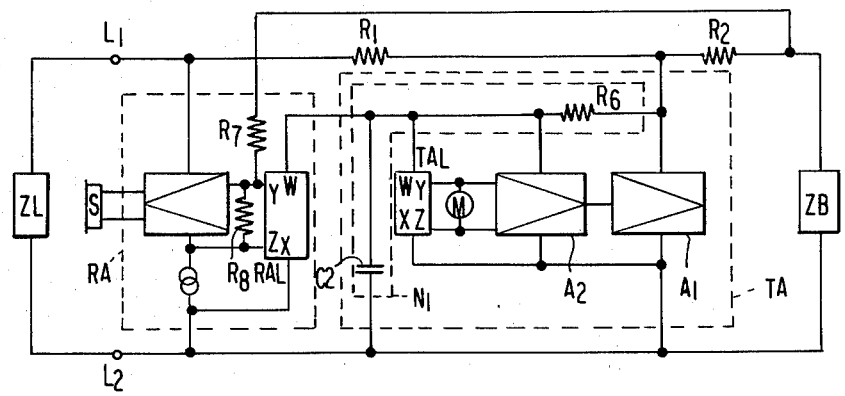
FIG. 5 shows a circuit diagram for a third embodiment of the present invention.

FIG. 5 shows a third embodiment of the present invention. The transmission amplifier TA includes a main amplifier $A_1$, a pre-amplifier $A_2$, an RC smoothing circuit $N_1$ and a line equalization circuit TAL. The RC smoothing circuit $N_1$ comprises a series circuit of a resistance $R_6$ and a capacitor $C_2$ connected between the contact point of the resistances $R_1$ and $R_2$ and the line terminal $L_2$. The output of the RC smoothing circuit or the power source circuit $N_1$ is supplied to the pre-amplifier $A_2$ and the power source terminals W and X of the line equalization circuit TAL. The output terminals Y and Z which are controlled by the line equalization circuit TAL, are connected in parallel to a microphone M, and the resistance between the terminals Y and Z of the line equalization circuit TAL varies depending on the variation of the output from the RC smoothing circuit, thereby controlling the input to the pe-amplifier $A_2$. In other words, the output from RC smoothing circuit $N_1$ becomes greater at a short distance, and the operational resistance between the output terminals Y and Z of the equalizing circuit TAL becomes smaller. This will add the parallel loss to the microphone M. At a greater distance, the output from RC smoothing circuit $N_1$ becomes smaller, the operational resistance between Y and Z of the line equalization circuit TAL greater, thereby decreasing the parallel loss at the microphone M.

The receiver amplifier RA includes a line equalization circuit RAL. The input to the receiver amplifier is connected to the input resistance $R_8$ via the resistance $R_7$ from the connecting point of the resistance $R_2$ and the side tone balancing circuit $Z_B$. The line equalization circuit RAL is connected in parallel to the input resistance $R_8$. A DC voltage of the smoothing circuit $N_1$ is supplied to the power source terminals W and X of the line equalization circuit RAL. The output terminals Y and Z, which are controlled by the equalization circuit RAL, are connected to the input terminal of the receiver amplifier RA and adjust the receiver input depending on the voltage of the smoothing circuit, thereby performing the line equalization. In other words, the equalization circuit RAL acts as a parallel variable resistance for the resistance $R_8$.

Figure 6:
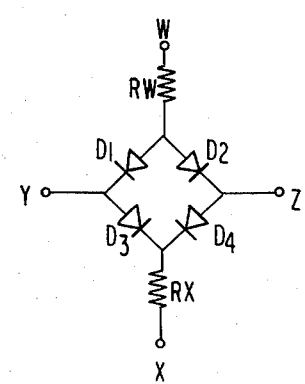
FIG. 6 shows a line equalizing circuit used in the third embodiment of the present invention.

Both equalization circuits TAL and RAL are embodied with identical circuit structures. As shown in FIG. 6, the equalization circuits are constructed by connecting in parallel the series circuit of diodes $D_1$ and $D_3$, and the series connected circuit of diodes $D_2$ and $D_4$ in the sequential order. There are connected a resistance RW to the connecting point of the diodes $D_1$ and $D_2$ and a resistance RX to the connecting point of the diodes $D_3$ and $D_4$, and the respective other ends of these resistances RW and RX are the power source terminals W and X. The connecting point of the diodes $D_1$ and $D_3$ and the connecting point of the diodes $D_2$ and $D_4$ become the controlled output terminals Y and Z. The DC voltage supplied between terminals W and X controls the DC current of diodes $D_1 \sim D_4$.

The above line equalization circuit is a variable impedance alternating current shunt inserted in parallel to the input impedance of the microphone or the receiver amplifier. The impedance of the shunt is controlled by the voltage supplied. Since an increased DC current flowing in the diodes generally results in a decrease of the operational resistance of the diodes, the operational resistance between the controlled output terminals Y and Z becomes decreased by the increased DC voltage supplied to the power source terminals W and X.

Thus, it is not necessary for the line equalization circuits TAL and RAL to provide new power source circuits since the voltage of the smoothing circuit $N_1$ for the preamplifier included in the transmitter amplifier is utilized. It also acts as an automatic variable attenuator for the input to the receiver amplifier and the transmitter amplifier TA. Accordingly, since the automatic variable attenuator is connected to the input terminals of the amplifiers with a lower AC signal level both for transmission and receiving, non-linear distortions which often appear with the automatic gain variable circuit become negligibly small. If the resistance $R_7$ is selected to be comparatively large, then both the equalization circuits RAL and TAL become irrelevant to the impedance $Z_O$ of the transmission circuit.

In the above mentioned embodiment, the resistance $R_1$ was selected to be 30$\Omega$, the resistance $R_2$, 300$\Omega$, the resistance $R_6$, 820$\Omega$, the resistance $R_7$, 7.5 K$\Omega$, and the resistance $R_8$, 4 K$\Omega$. As discussed heretofore, the telephone set utilizing the transmission circuit in accordance with the present invention has such superior advantages as (1) the power of the source is effectively utilized since the power source current for the receiver amplifier does not pass the resistances or the impedance, (2) the distortionless maximum output voltage is increased since the output loss of the transmission amplifier may be minimized, (3) the size of the capacitor for the balancing network becomes compact, which proves advantageous for packaging, and (4) the impedance for the transmission network does not change because of the line equalization, performing good matching to the telephone line.

The telephone set according to the present invention is further advantageous since it is provided with a circuit which automatically detects the DC voltage of the lines, and it automatically changes the side tone balancing conditions so that good balancing is maintained constantly.

It is also possible to provide a circuit which automatically changes the operational conditions of the receiver amplifier or the transmission amplifier depending on the size of the DC voltage of the lines, thereby automatically adjusting the transmission level of the respective amplifiers.

What is claimed is:

1. A telephone transmission circuit for connection to a line having first and second line terminals, said telephone transmission circuit comprising: a microphone for providing voice frequency signals; a transmitter amplifier means for amplifying the voice frequency signals from said microphone; a receiver amplifier means for amplifying voice frequency signals received from said line; a serially connected circuit means connected between said first and second line terminals, said circuit means comprising a first resistance, a second resistance and a balancing network for preventing the output from said transmitter amplifier from entering said receiver amplifier; a smoothing circuit means for smoothing a voltage supplied from said line, said smoothing circuit comprising a third resistor having one end connected to the connection point of said first and second resistors and a first capacitor connected between said second line terminal and the other end of said third resistor; a first line equalization circuit connected in parallel with said first capacitor of said smoothing circuit for varying the input impedance of said transmitter amplifier in accordance with the charge voltage of said first capacitor; a second line equalization circuit connected in parallel with said first capacitor for varying the input impedance of said receiver amplifier in accordance with the charge voltage of said first capacitor; a constant current circuit; said transmitter amplifier and said receiver amplifier each having power source terminals supplied with DC current from said first and second line terminals, said power source terminals of said transmitter amplifier being connected between the connecting point of said first and second resistances and said second line terminal, said power source terminals of said receiver amplifier being connected in parallel with said serially connected circuit means via said constant current circuit, and the input signals of said receiver amplifier being supplied from the connecting point of said second resistance and said balancing network to input terminals of said receiver amplifier, which input terminals of said receiver amplifier are connected in parallel with said second line equalization circuit.

2. A telephone transmission circuit as claimed in claim 1, wherein said balancing network changes its impedance in accordance with the voltage between said first and second line terminals.

3. A telephone transmission circuit as claimed in claim 2 wherein each of said first and second line equalization circuits includes the series connection of first and second diodes connected sequentially, and the series connection of third and fourth diodes connected sequentially, each of said series connections being connected with one another.

* * * * *

UNITED STATES PATENT AND TRADEMARK OFFICE
CERTIFICATE OF CORRECTION

PATENT NO. : 4,394,542

DATED : July 19, 1983

INVENTOR(S) : Michio Hara et al

It is certified that error appears in the above-identified patent and that said Letters Patent is hereby corrected as shown below:

In column 4, line 10, "resistance" should be --resistances--.

In column 5, line 60, "pe-amplifier" should be --pre-amplifier--.

Signed and Sealed this

Thirteenth Day of March 1984

[SEAL]

Attest:

Attesting Officer

GERALD J. MOSSINGHOFF

Commissioner of Patents and Trademarks